United States Patent [19]

Perkins

[11] Patent Number: 5,544,442
[45] Date of Patent: Aug. 13, 1996

[54] MULTIPLE FISHING HOOK AND LEADER STORAGE DEVICE

[76] Inventor: Jamie Perkins, 8294 NW. 24th St., Coral Springs, Fla. 33065

[21] Appl. No.: 562,704

[22] Filed: Nov. 27, 1995

[51] Int. Cl.⁶ .................................................. A01K 97/06
[52] U.S. Cl. ................................. 43/57.2; 43/57.1
[58] Field of Search ...................... 43/57.1, 57.2

[56] References Cited

U.S. PATENT DOCUMENTS

| | | | |
|---|---|---|---|
| 2,716,302 | 8/1955 | Dutton | 43/57.1 |
| 3,032,914 | 5/1962 | Valle | 43/57.2 |
| 3,166,866 | 1/1965 | Norton | 43/57.1 |
| 3,890,737 | 6/1975 | Jones | 43/57.2 |
| 4,769,941 | 9/1988 | Schmidt | 43/57.1 |
| 4,961,281 | 10/1990 | Listebarger | 43/57.2 |
| 5,018,298 | 5/1991 | Spears | 43/57.2 |
| 5,289,940 | 3/1994 | Wisenbaugh | 43/57.1 |

*Primary Examiner*—Jack W. Lavinder
*Assistant Examiner*—James Miner

[57] ABSTRACT

A multiple fishing hook and leader storage device is disclosed including a reel including a tube, two end plates and a plurality of discs. The tube is formed in a hollow elongated cylindrical configuration with two ends and an outer surface. Each end plate is formed in a planar circular configuration with a central aperture and an outer perimeter including thumb knurling, one end plate being releasably coupled to each end of the tube, the tube including an elongated rectangular shaped line coupling region extending longitudinally across the outer surface of the tube from one end plate to the other. An elastomeric coating is positioned around the outer surface of the tube except for the line coupling region, the discs being fabricated of elastomeric materials and radially positioned along the tube at equidistantly spaced intervals. One large aperture and one small aperture is positioned within the line coupling region adjacent to each disc.

6 Claims, 3 Drawing Sheets

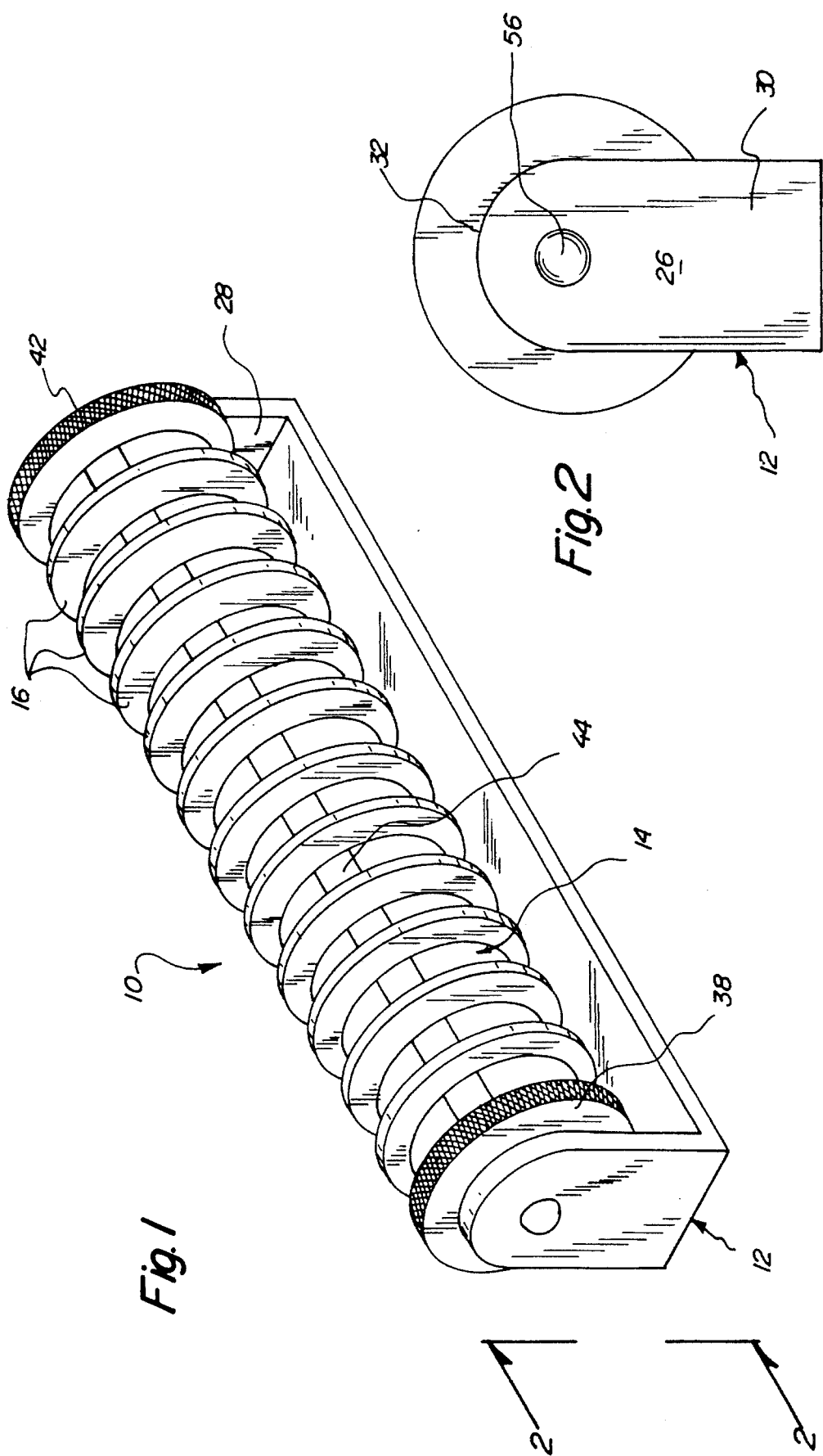

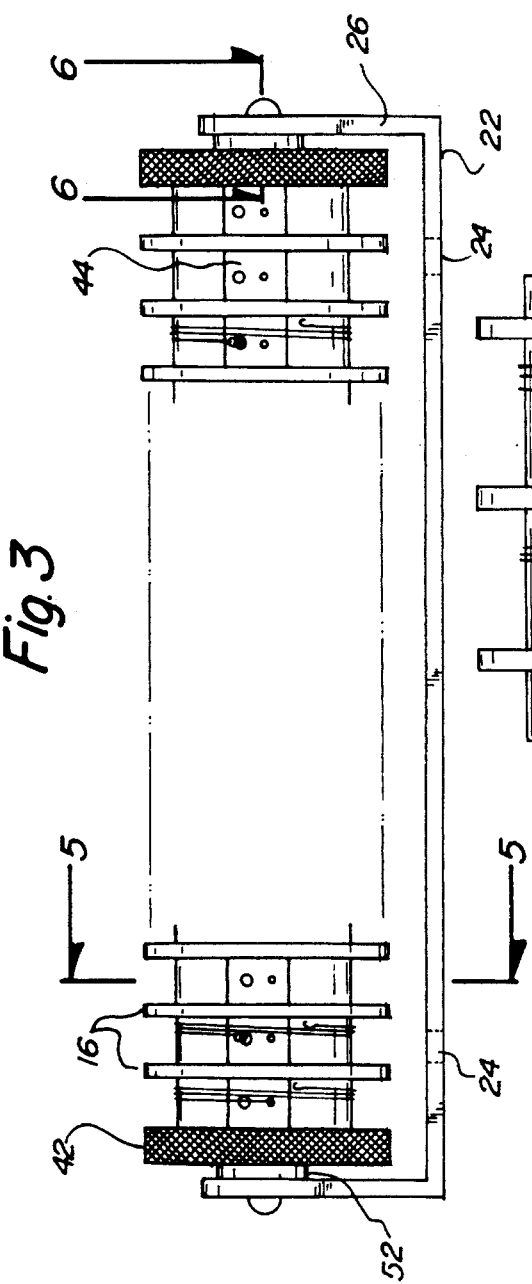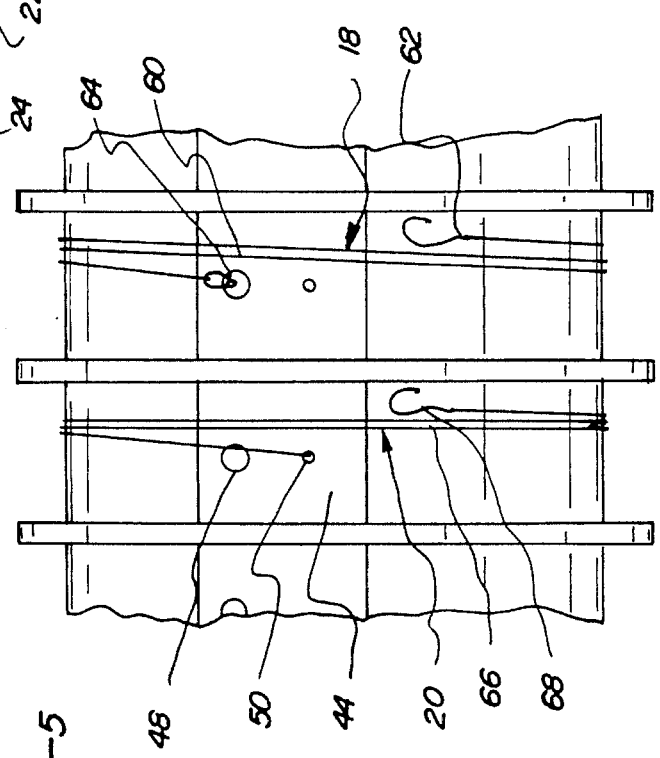

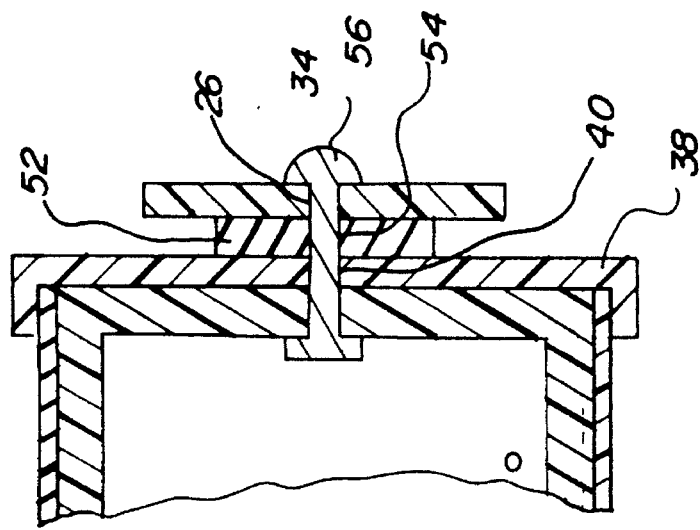
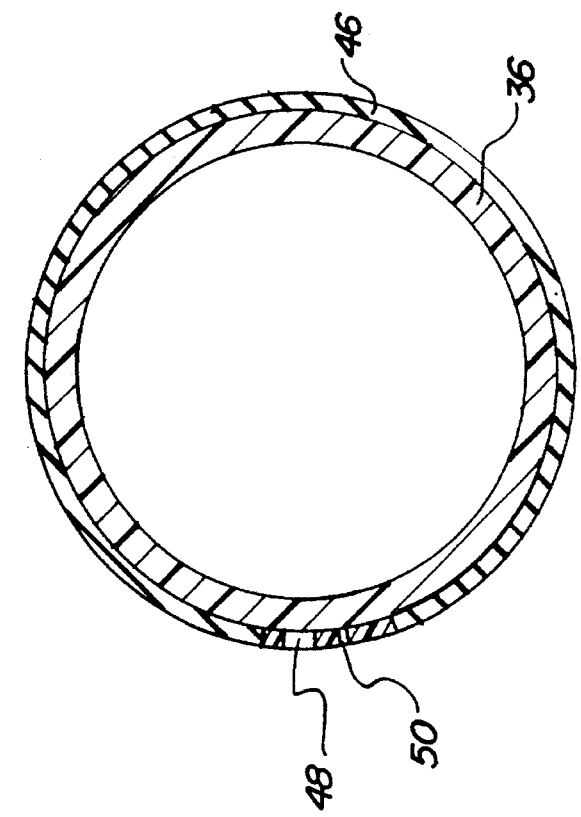

MULTIPLE FISHING HOOK AND LEADER STORAGE DEVICE

BACKGROUND OF THE INVENTION

1. Field of the Invention

The present invention relates to a multiple fishing hook and leader storage device and more particularly pertains to storing a plurality of fishing hooks and leaders around the cylindrical reel of the apparatus.

2. Description of the Prior Art

The use of fishing hook and leader storage means is known in the prior art. More specifically, fishing hook and leader storage means heretofore devised and utilized for the purpose of storing and transporting fishing hooks and leaders are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,281,806 to McMullen a fishing leader storage reel.

U.S. Pat. No. 4,200,249 to Synstelien discloses a storage device.

U.S. Pat. No. 4,036,451 to Pipkin discloses a hook and leader storage device.

U.S. Pat. No. 5,269,090 to Richards discloses a hook and leader storage box for fishermen.

Lastly, U.S. Pat. No. 3,881,273 to Herring discloses a hook and leader storage structure.

In this respect, the multiple fishing hook and leader storage device according to the present invention substantially departs from the conventional concepts and designs of the prior art, and in doing so provides an apparatus primarily developed for the purpose of storing a plurality of fishing hooks and leaders around the cylindrical reel of the apparatus.

Therefore, it can be appreciated that there exists a continuing need for a new and improved multiple fishing hook and leader storage device which can be used for storing a plurality of fishing hooks and leaders around the cylindrical reel of the apparatus. In this regard, the present invention substantially fulfills this need.

SUMMARY OF THE INVENTION

In view of the foregoing disadvantages inherent in the known types of fishing hook and leader storage means now present in the prior art, the present invention provides an improved multiple fishing hook and leader storage device. As such, the general purpose of the present invention, which will be described subsequently in greater detail, is to provide a new and improved multiple fishing hook and leader storage device and method which has all the advantages of the prior art and none of the disadvantages.

To attain this, the present invention essentially comprises a new and improved multiple fishing hook and leader storage device comprising, in combination: a mounting bracket including a base formed in an elongated planar rectangular configuration with two ends and two apertures extending therethrough, each end including an upstanding generally semioval shaped side support, each side support including an inner surface, an outer surface, a rounded upper extent and a circular hole positioned therethrough; a reel including a tube, two end plates and a plurality of discs, the tube being fabricated of white polyethylene and formed in a hollow elongated cylindrical configuration with two ends and an outer surface, each end plate being formed in a planar circular configuration with a central aperture and an outer perimeter including thumb knurling, one end plate being releasably coupled to each end of the tube, the tube including an elongated rectangular shaped line coupling region extending longitudinally across the outer surface of the tube from one end plate to the other, a rubber coating being positioned around the outer surface of the tube except for the line coupling region, the discs being fabricated of rubber and radially positioned along the tube at equidistantly spaced intervals, one large aperture and one small aperture being positioned within the line coupling region adjacent to each disc; two rubber washers each having a central hole, each washer abutting the inner surface of a side support with the hole of the washer and side support being in alignment, the reel being rotatably coupled between the side supports and washers with two rivets, one rivet being rotatably coupled through each side support, washer and end plate of the reel thereby suspending the reel above the base of the support bracket; and a plurality of fishing leaders comprising first and second groups, a first group of leaders each including a length of line with a first end having a hook and a second end having a swivel, a second group of leaders each including a length of line with a first end having a hook and a second end being free, the swivels of the first group of leaders being friction fit within the large apertures of the line coupling region, the free ends of the second group of leaders being coupled through the small apertures of the line coupling region, the lines of each leader being rolled around the reel between the discs with each respective hook being embedded within the rubber coating of the reel to help prevent injury to a user.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved multiple fishing hook and leader storage device which has all of the advantages of the prior art fishing hook and leader storage means and none of the disadvantages.

It is another object of the present invention to provide a new and improved multiple fishing hook and leader storage device which may be easily and efficiently manufactured and marketed.

It is further object of the present invention to provide a new and improved multiple fishing hook and leader storage device which is of durable and reliable constructions.

An even further object of the present invention is to provide a new and improved multiple fishing hook and leader storage device which is susceptible of a low cost of manufacture with regard to both materials and labor, and which accordingly is then susceptible of low prices of sale to the consuming public, thereby making such multiple fishing hook and leader storage device economically available to the buying public.

Still yet another object of the present invention is to provide a new and improved multiple fishing hook and leader storage device which provides in the apparatuses and methods of the prior art some of the advantages thereof, while simultaneously overcoming some of the disadvantages normally associated therewith.

Still another object of the present invention is to storing a plurality of fishing hooks and leaders around the cylindrical reel of the apparatus.

Lastly, it is an object of the present invention to provide a new and improved multiple fishing hook and leader storage device comprising: a reel including a tube, two end plates and a plurality of discs, the tube being formed in a hollow elongated cylindrical configuration with two ends and an outer surface, each end plate being formed in a planar circular configuration with a central aperture and an outer perimeter including thumb knurling, one end plate being releasably coupled to each end of the tube, the tube including an elongated rectangular shaped line coupling region extending longitudinally across the outer surface of the tube from one end plate to the other, an elastomeric coating being positioned around the outer surface of the tube except for the line coupling region, the discs being fabricated of elastomeric materials and radially positioned along the tube at equidistantly spaced intervals, one large aperture and one small aperture being positioned within the line coupling region adjacent to each disc.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the multiple fishing hook and leader storage device constructed in accordance with the principles of the present invention.

FIG. 2 is a side perspective view of the apparatus shown in FIG. 1.

FIG. 3 is a front elevational view of the apparatus shown in FIG. 1.

FIG. 4 is an enlarged perspective view of the line coupling region of the reel.

FIG. 5 is a cross sectional view taken along section line 5—5 of FIG. 3.

FIG. 6 is a cross sectional view taken along section line 6—6 of FIG. 3.

The same reference numerals refer to the same parts through the various Figures.

DESCRIPTION OF THE PREFERRED EMBODIMENT

With reference now to the drawings, and in particular to FIG. 1 thereof, the preferred embodiment of the new and improved multiple fishing hook and leader storage device embodying the principles and concepts of the present invention and generally designated by the reference numeral 10 will be described.

The present invention, the multiple fishing hook and leader storage device 10 is comprised of a plurality of components. Such components in their broadest context include a mounting bracket 12, a reel 14, a plurality of discs 16 and a plurality of fishing leaders 18, 20. Such components are individually configured and correlated with respect to each other so as to attain the desired objective.

More specifically, a mounting bracket 12 includes a base 22 formed in an elongated planar rectangular configuration. The mounting bracket has two ends which define the sides of the base. The base has a length of about 12 inches and a thickness of about ¾ inch. The base is fabricated of plastic in the preferred embodiment. The base is fabricated of wood in alternate embodiments. Two apertures 24 extend through the base adjacent to each end. The apertures permit a user to affix the mounting bracket to a surface such as a bench with bolts or screws. Each end includes an upstanding generally semioval shaped side support 26. Each side support has an inner surface 28, an outer surface 30, a rounded upper extent 32 and a circular hole 34 positioned through it. Each side support is about 3¾ inches in height. The hole is located about half way between the centerpoint and rounded upper extent of each side support. Note FIGS. 1, 2, 5 and 6.

A reel 14 includes a tube 36, two end plates 38 and a plurality of discs 16. The tube 36 is fabricated of white polyethylene and formed in a hollow, elongated cylindrical configuration with two ends and an outer surface. The tube is about 11 inches in length. Each end plate 38 is formed in a planar circular configuration with a central aperture 40 and an outer perimeter which includes thumb knurling 42. The thumb knurling facilitates rotation of the apparatus in an operative orientation. Each end plate is about ½ inch thick and 3¼ inches in diameter. One end plate is releasably coupled to each end of the tube. The tube includes an elongated rectangular shaped line coupling region 44 which extends longitudinally across the outer surface of the tube from one end plate to the other. The fishing leaders are coupled to the line coupling region in an operative orientation. Note FIGS. 1, 2 and 6.

A rubber coating 46 is positioned around the outer surface of the tube except for the line coupling region. The sharp points of the hooks of the leaders are embedded within the rubber coating to enable users to manipulate the reel without risk of injury. The discs 16 are fabricated of rubber and are radially positioned along the tube at equidistantly spaced intervals. The discs are each about ⅛ inch thick and between about ⅜ and ½ inch in height. One half inch separates each disc from an adjacent disc or an adjacent end plate. One large aperture 48 and one small aperture 50 are positioned within the line coupling region adjacent to each disc. The small apertures are about ⅛ inch in diameter. The free ends of the line of the second group of leaders are coupled within the small apertures. The large apertures have a diameter larger than ⅛ inch and are appropriately sized to frictionally receive conventionally sized and shaped swivels which are normally coupled to leaders. Note FIGS. 3 and 4.

Two rubber washers 52 each have a central hole 54. Each washer abuts the inner surface of a side support with the hole of the washer and hole of the side support being positioned in alignment. The reel is rotatably coupled between the side supports and washers with two rivets 56. The washers frictionally prevent free spinning of the reel during use. One rivet is rotatably coupled through each side support, washer and end plate of the reel thereby suspending the reel above the base of the support bracket. The reel is positioned between about ½ inch and 1 inch above the base. The apparatus measures about six inches in vertical height from the top of the discs to the bottom of the base. Note FIGS. 2 and 3.

A plurality of fishing leaders 18, 20 comprise first and second groups. A first group of leaders 18 each include a length of line 60. The length of line 60 has a first end which includes a hook 62 and a second end which includes a swivel 64. A second group of leaders 20 each including a length of line 66. The length of line 66 has a first end which includes a hook 68 and a second end which is free. The swivels of the first group of leaders are friction fit within the large apertures of the line coupling region. The free ends of the second group of leaders are coupled through the small apertures of the line coupling region. When a user wishes to store the leaders the lines are rolled around the reel between the discs with the respective hooks being embedded within the rubber coating of the reel. Embedding of the hooks serves to retain the leaders tightly wound around the reel. When a user wishes to remove the leader, the hook is removed from its embedded orientation and the reel is rotated to unwind the line of the leader. The discs divide the reel into separate segments to prevent tangling of the leaders and enhance safety to users. Note FIGS. 3 and 4.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved multiple fishing hook and leader storage device comprising, in combination:

a mounting bracket including a base formed in an elongated planar rectangular configuration with two ends and two apertures extending therethrough, each end including an upstanding generally semioval shaped side support, each side support including an inner surface, an outer surface, a rounded upper extent and a circular hole positioned therethrough;

a reel including a tube, two end plates and a plurality of discs, the tube being fabricated of white polyethylene and formed in a hollow elongated cylindrical configuration with two ends and an outer surface, each end plate being formed in a planar circular configuration with a central aperture and an outer perimeter including thumb knurling, one end plate being releasably coupled to each end of the tube, the tube including an elongated rectangular shaped line coupling region extending longitudinally across the outer surface of the tube from one end plate to the other, a rubber coating being positioned around the outer surface of the tube except for the line coupling region, the discs being fabricated of rubber and radially positioned along the tube at equidistantly spaced intervals, one large aperture and one small aperture being positioned within the line coupling region adjacent to each disc;

two rubber washers each having a central hole, each washer abutting the inner surface of a side support with the hole of the washer and side support being in alignment, the reel being rotatably coupled between the side supports and washers with two rivets, one rivet being rotatably coupled through each side support, washer and end plate of the reel thereby suspending the reel above the base of the support bracket; and a plurality of fishing leaders comprising first and second groups, a first group of leaders each including a length of line with a first end having a hook and a second end having a swivel, a second group of leaders each including a length of line with a first end having a hook and a second end being free, the swivels of the first group of leaders being friction fit within the large apertures of the line coupling region, the free ends of the second group of leaders being coupled through the small apertures of the line coupling region, the lines of each leader being rolled around the reel between the discs with each respective hook being embedded within the rubber coating of the reel to help prevent injury to a user.

2. A multiple fishing hook and leader storage device comprising:

a reel including a tube, two end plates and a plurality of discs, the tube being formed in a hollow elongated cylindrical configuration with two ends and an outer surface, each end plate being formed in a planar circular configuration with a central aperture and an outer perimeter including thumb knurling, one end plate being releasably coupled to each end of the tube, the tube including an elongated rectangular shaped line coupling region extending longitudinally across the outer surface of the tube from one end plate to the other, an elastomeric coating being positioned around the outer surface of the tube except for the line coupling region, the discs being fabricated of elastomeric materials and radially positioned along the tube at equidistantly spaced intervals, one large aperture and one small aperture being positioned within the line coupling region adjacent to each disc.

3. The multiple fishing hook and leader storage device as set forth in claim 2 and further including:

a mounting bracket including a base formed in an elongated planar rectangular configuration with two ends and two apertures extending therethrough, each end including an upstanding generally semioval shaped side support, each side support including an inner surface, an outer surface, a rounded upper extent and a circular hole positioned therethrough; and two rubber washers each having a central hole, each washer abutting the inner surface of a side support with the hole of the washer and side support being in alignment, the reel being rotatably coupled between the side supports and washers with two rivets, one rivet being rotatably coupled through each side support, washer and end plate of the reel thereby suspending the reel above the base of the support bracket.

4. The multiple fishing hook and leader storage device as set forth in claim 2 and further including:

a plurality of fishing leaders comprising first and second groups, a first group of leaders each including a length of line with a first end having a hook and a second end having a swivel, a second group of leaders each including a length of line with a first end having a hook and a second end being free, the swivels of the first group of leaders being friction fit within the large apertures of the line coupling region, the free ends of the second group of leaders being coupled through the small apertures of the line coupling region, the lines of each leader being rolled around the reel between the discs with each respective hook being embedded within the rubber coating of the reel to help prevent injury to a user.

5. The multiple fishing hook and leader storage device as set forth in claim 2 wherein the mounting bracket and tube are fabricated of plastic.

6. The multiple fishing hook and leader storage device as set forth in claim 2 wherein the mounting bracket and tube are fabricated of wood.

* * * * *